United States Patent
Tsai (10) Patent No.: US 12,533,282 B2
(45) Date of Patent: Jan. 27, 2026

(54) AIR INFLATABLE MASSAGE CUSHION

(71) Applicant: Dongguan Jiashuan Industrial Co., Ltd., Guangdong (CN)

(72) Inventor: Pei-Lin Tsai, Sihu Township (TW)

(73) Assignee: Dongguan Jiashuan Industrial Co., Ltd., Guangdong (CN)

( * ) Notice: Subject to any disclaimer, the term of this patent is extended or adjusted under 35 U.S.C. 154(b) by 1087 days.

(21) Appl. No.: 17/157,375

(22) Filed: Jan. 25, 2021

(65) Prior Publication Data
US 2022/0110820 A1  Apr. 14, 2022

(30) Foreign Application Priority Data

Oct. 13, 2020  (CN) .......................... 202011092989.5

(51) Int. Cl.
| | | |
|---|---|---|
| *A61M 9/00* | (2006.01) | |
| *A47C 27/08* | (2006.01) | |
| *A47C 27/10* | (2006.01) | |
| *A61H 9/00* | (2006.01) | |

(52) U.S. Cl.
CPC .......... *A61H 9/0078* (2013.01); *A47C 27/082* (2013.01); *A47C 27/10* (2013.01)

(58) Field of Classification Search
CPC .................................................. A61H 9/0078
See application file for complete search history.

(56) References Cited

U.S. PATENT DOCUMENTS

| | | | |
|---|---|---|---|
| 6,273,866 B2 | 8/2001 | Thomas et al. | |
| 6,960,159 B2* | 11/2005 | Chung | A61H 9/0078 600/15 |
| 10,617,594 B2* | 4/2020 | Fujishiro | A61H 9/0078 |
| 11,504,293 B2* | 11/2022 | Weber | B60N 2/976 |
| 2004/0226102 A1 | 11/2004 | Hampton et al. | |
| 2005/0262638 A1 | 12/2005 | Libunao | |
| 2006/0117488 A1 | 6/2006 | Hung et al. | |
| 2010/0042026 A1* | 2/2010 | Kloecker | A61F 5/34 601/149 |
| 2016/0059750 A1* | 3/2016 | Lem | B60N 2/976 601/149 |
| 2016/0304009 A1* | 10/2016 | Ogiso | B60N 2/914 |
| 2017/0101038 A1* | 4/2017 | Hall | B60N 2/42 |

(Continued)

FOREIGN PATENT DOCUMENTS

| | | |
|---|---|---|
| CN | 201768138 U | 3/2011 |
| CN | 203436544 U | 2/2014 |

(Continued)

*Primary Examiner* — LaToya M Louis
(74) *Attorney, Agent, or Firm* — ScienBiziP, P.C.

(57) ABSTRACT

An air inflatable massage cushion contains: a body and a control box which is connected with the body via the multiple air tubes. The body includes multiple airbags communicating with at least one air channel via multiple air conduits, wherein a respective air channel is in connection with some of the multiple airbags, different air channels are connected with the multiple airbags which are intersected with one another. A respective one airbag does not communicate with at least one adjacent airbag so as to inflate or deflate airs in some airbags not communicate with one another via different air channels, thus inflating and deflating the airs of the airbags at different positions of the body to obtain air permeability and a massage effect.

15 Claims, 10 Drawing Sheets

(56) References Cited

U.S. PATENT DOCUMENTS

| | | | | |
|---|---|---|---|---|
| 2018/0009343 A1* | 1/2018 | Saren | .................... | A61H 9/0078 |
| 2019/0358115 A1* | 11/2019 | Waldridge | ........... | A61H 9/0078 |
| 2020/0390641 A1* | 12/2020 | Arthurs | .................. | A61H 1/006 |
| 2021/0267839 A1* | 9/2021 | Watson | .................. | B60N 2/976 |
| 2021/0300224 A1* | 9/2021 | Tait | .......................... | B60N 2/56 |

FOREIGN PATENT DOCUMENTS

| | | |
|---|---|---|
| CN | 103690321 A | 4/2014 |
| CN | 109822955 A | 5/2019 |
| CN | 209818266 U | 12/2019 |
| CN | 210020150 U | 2/2020 |
| CN | 111449932 A | 7/2020 |
| GB | 2428193 A | 1/2007 |
| JP | H0938165 A | 2/1997 |
| JP | 2005013559 A | 1/2005 |
| JP | 2019033867 A | 3/2019 |
| KR | 200360202 Y1 | 8/2004 |
| KR | 20130050848 A | 5/2013 |
| KR | 20200009491 A | 1/2020 |
| TW | M420255 U | 1/2012 |
| WO | 2015128060 A1 | 9/2015 |

* cited by examiner

AIR INFLATABLE MASSAGE CUSHION

FIELD OF THE INVENTION

The present invention relates to an air inflatable massage cushion which is capable of inflating or deflating airs alternately.

BACKGROUND OF THE INVENTION

At present, there are two main massage methods for massage cushions. One is to use mechanical action, such as balls, vibrating rods, etc., to act on the human body to produce a massage effect; the other is to repeatedly inflate and deflate the air cushion through air to make the air cushion rise suddenly, thus producing massage effect.

However, it spends high cost for massaging mechanically or it is difficult to massage the user when inflating or deflating the airs at one time.

The present invention has arisen to mitigate and/or obviate the afore-described disadvantages.

SUMMARY OF THE INVENTION

The primary objective of the present invention is to provide an air inflatable massage cushion which is capable of inflating or deflating airs alternately so as to massage and ventilation, thus relaxing muscles and obtaining smooth blood circulation Secondary objective of the present invention is to provide an air inflatable massage cushion which contains the multiple air conduits configured to inflate the airs into the multiple airbags which are not communicated so that after the air inflatable massage cushion is electrically conductive to work, some airbags are inflated the airs, and the other airbags are deflated the airs, thus protruding and sinking the multiple airbags alternately to massage the user easily and inflating the airs accurately.

To obtain above-mentioned aspects, an air inflatable massage cushion provided by the present invention contains: a body and a control box which is connected with the body via the multiple air tubes.

The body includes multiple airbags communicating with at least one air channel via multiple air conduits, wherein a respective air channel is in connection with some of the multiple airbags, different air channels are connected with the multiple airbags which are intersected with one another.

A respective one airbag does not communicate with at least one adjacent airbag so as to inflate or deflate airs in some airbags not communicate with one another via different air channels, thus inflating and deflating the airs of the airbags at different positions of the body to obtain air permeability and a massage effect.

Preferably, a respective air channel is connected with a respective airbag to form a respective air inflation unit of multiple air inflation units, wherein the air inflatable massage cushion comprises at least one air inflation unit which is intersected and arranged obliquely or is arranged parallelly.

Preferably, the air inflatable massage cushion is formed in a square shape, wherein some air conduits proximate to a peripheral side of the top face are formed in an L shape or an inverted L shape, and any adjacent airbags are connected obliquely at 45 degree.

Preferably, the multiple airbags are arranged together to form an airbag area, wherein the at least one air channel passes through a peripheral side of the air area and is connected with at least one airbag, wherein some airbags inside a peripheral side of the airbag area are connected with the at least one air channel, and the other airbags around the peripheral side of the airbag area are connected parallelly.

Preferably, the body includes a first cushion layer and a second cushion layer, and a respective air channel includes a respective air conduit, multiple air orifices, and multiple air nozzles, wherein a bottom of the first cushion layer is connected with the second cushion layer, wherein the first cushion layer includes a top face, and the multiple airbags extending from the top face.

Preferably, the second cushion layer includes a bottom face, multiple air orifices, and multiple air nozzles, wherein the multiple air orifices are defined beside a peripheral side of the bottom face, and the multiple air nozzles are arranged on the multiple air nozzles and are connected with the multiple air tubes.

Preferably, the air inflatable massage cushion comprises multiple bodies, and any two adjacent bodies are connected by at least one zipper, at least one hook and loop fastener, and at least one button.

Preferably, at least two bodies are stacked so that a second cushion layer of one body contacts with a first cushion layer of the other body, and a first cushion of the one body exposes outside.

Preferably, an air pump is received in a control box, wherein the control box includes a first cap and a second cap which are both made of plastic, the first cap has a control panel electrically connected with a circuit board, and the circuit board is connected with the air pump, the air pump is connected with a valve element via multiple connection tubes, and the valve element is connected with multiple air outlets via multiple Y-shaped tubes, wherein the multiple air outlets are defined on the second cap and communicate with the multiple air tubes;

Preferably, the second cap includes a fuse, a switch, a power socket, wherein the power socket and the switch are connected with the air pump, and the circuit board drives four relays via four drive circuits of the four relays so as to correspond to three air inflation levels and an air deflation level; and Preferably, a time key, a start key, a massage level key, and a frequency key of the circuit board are connected with multiple power indicators so that the multiple power indicators display a working time, a working state and a pumping frequency of the air pump and an air flow exchanging volume of the two air inflation units.

Thereby, the multiple airbags are formed in different shapes, sizes, and has different heights to satisfy a variety of using requirements, and it is easy and accurate to operate air inflation and deflation.

DETAILED DESCRIPTION OF THE PREFERRED EMBODIMENTS

With reference to FIGS. 1-6, an air inflatable massage cushion according to a first embodiment of the present invention is capable of inflating or deflating airs alternately and comprises: a body 1, multiple air tubes 2, and a control box 3.

The body 1 includes multiple airbags 112 communicating with at least one air channel via multiple air conduits 113, wherein a respective air channel is in connection with some of the multiple airbags 112, different air channels are connected with the multiple airbags 112 which are intersected with one another, wherein a respective one airbag 112 does not communicate with at least one adjacent airbag 112 so as to inflate or deflate airs in some airbags 112 not communicate with one another via different air channels, thus inflating and deflating the airs of the airbags 112 at different positions of the body 1 to obtain air permeability and a massage effect.

The respective air channel is connected with a respective airbag 112 to form a respective air inflation unit of multiple air inflation units, wherein the air inflatable massage cushion comprises at least one air inflation unit which is intersected and arranged obliquely or is arranged parallelly.

Figure 3:
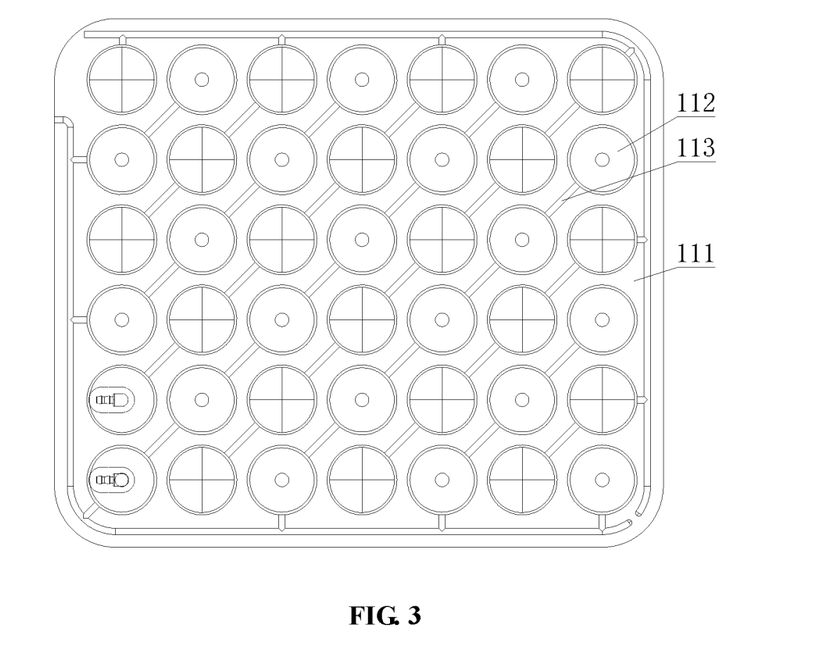
FIG. 3 is a side plane view showing the assembly of a part of the air inflatable massage cushion according to the first embodiment of the present invention.
Figure 4:
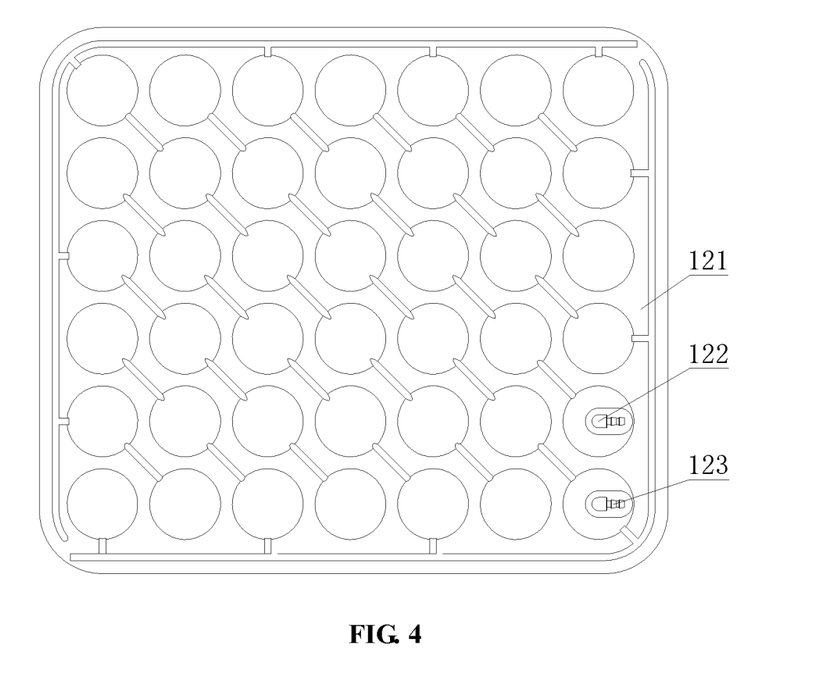
FIG. 4 is a side plane view showing the assembly of another part of the air inflatable massage cushion according to the first embodiment of the present invention.

The body 1 includes a first cushion layer 11 and a second cushion layer 12, and a respective air channel includes a respective air conduit 113, a respective one of multiple air orifices 122, and a respective one of multiple air nozzles 123, wherein a bottom of the first cushion layer 11 connected with the second cushion layer 12. Referring to FIG. 3, the first cushion layer 11 includes a top face 111, the multiple airbags 112 extending from the top face 111, and the multiple air conduits 113, wherein a respective air conduit 113 is defined between any two adjacent airbags 112 so that any two adjacent air conduits 112 communicate with each other via the respective air conduit 113. As shown in FIG. 4, a second cushion layer 12 includes a bottom face 121, multiple air orifices 122, and multiple air nozzles 123, wherein the multiple air orifices 122 are defined beside a peripheral side of the bottom face 121, and the multiple air nozzles 123 are arranged on the multiple air nozzles 123 and are connected with the multiple air tubes 2.

Preferably, the respective air conduit 113, a respective air orifice 122, and a respective air nozzle 123 are connected to form a respective air channel of at least one air channel, and the respective air channel is connected with a respective airbag 112 to form a respective air inflation unit of multiple air inflation units, as shown in FIG. 3, two adjacent air inflation units not communicated includes an air inflation unit marked by a cross and the other inflation marked by a circle.

The two adjacent air inflation units marked by the cross or the circle are communicated via the respective air conduit 113, and a respective air inflation unit includes the respective air orifice 122 and the respective air nozzle 123.

With reference to FIG. 3, the air inflatable massage cushion is formed in a square shape, wherein some air conduits 113 proximate to a peripheral side of the top face 111 are formed in an L shape or an inverted L shape, and any adjacent airbags 112 are connected obliquely at 45 degree, such that the airs are inflated into a half of the multiple airbags 112 after the massage cushion is electrically conductive to operate, and the airs are deflated from the other half of the multiple air airbags 112, thus projecting and denting the multiple air airbags 112 alternatively.

Figure 5:
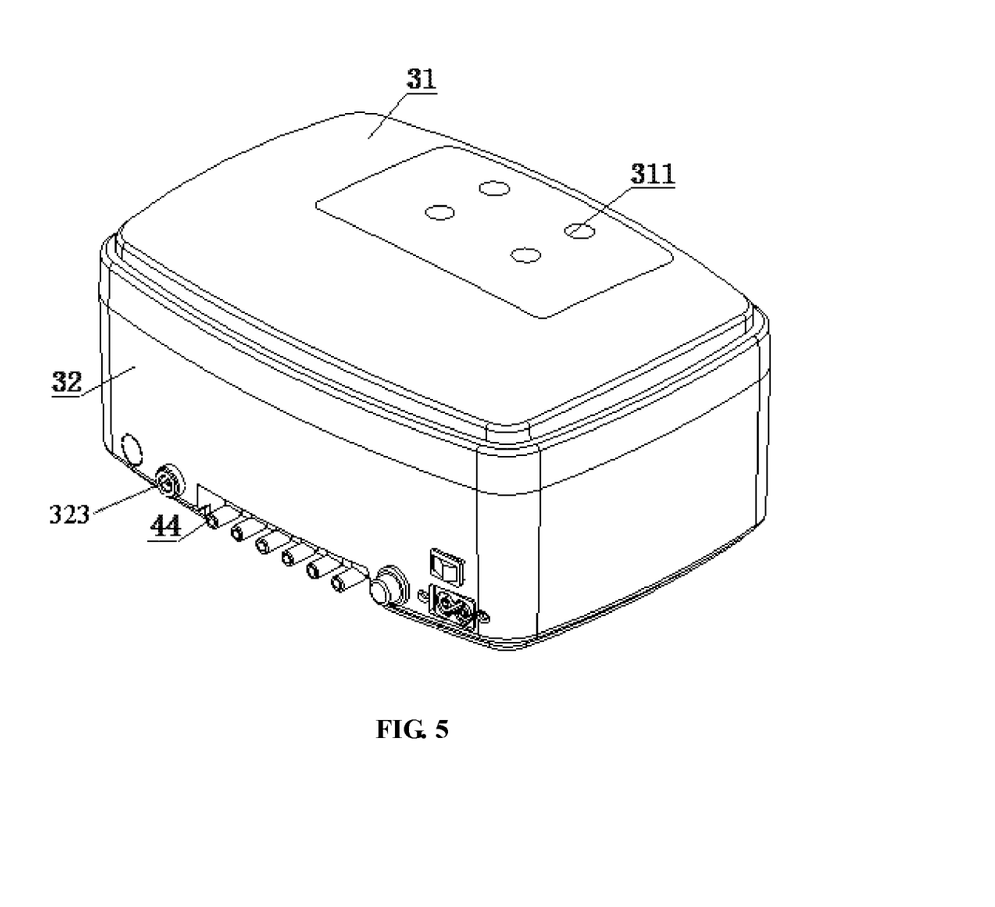
FIG. 5 is a perspective view showing the assembly of a part of the air inflatable massage cushion according to the first embodiment of the present invention.
Figure 6:
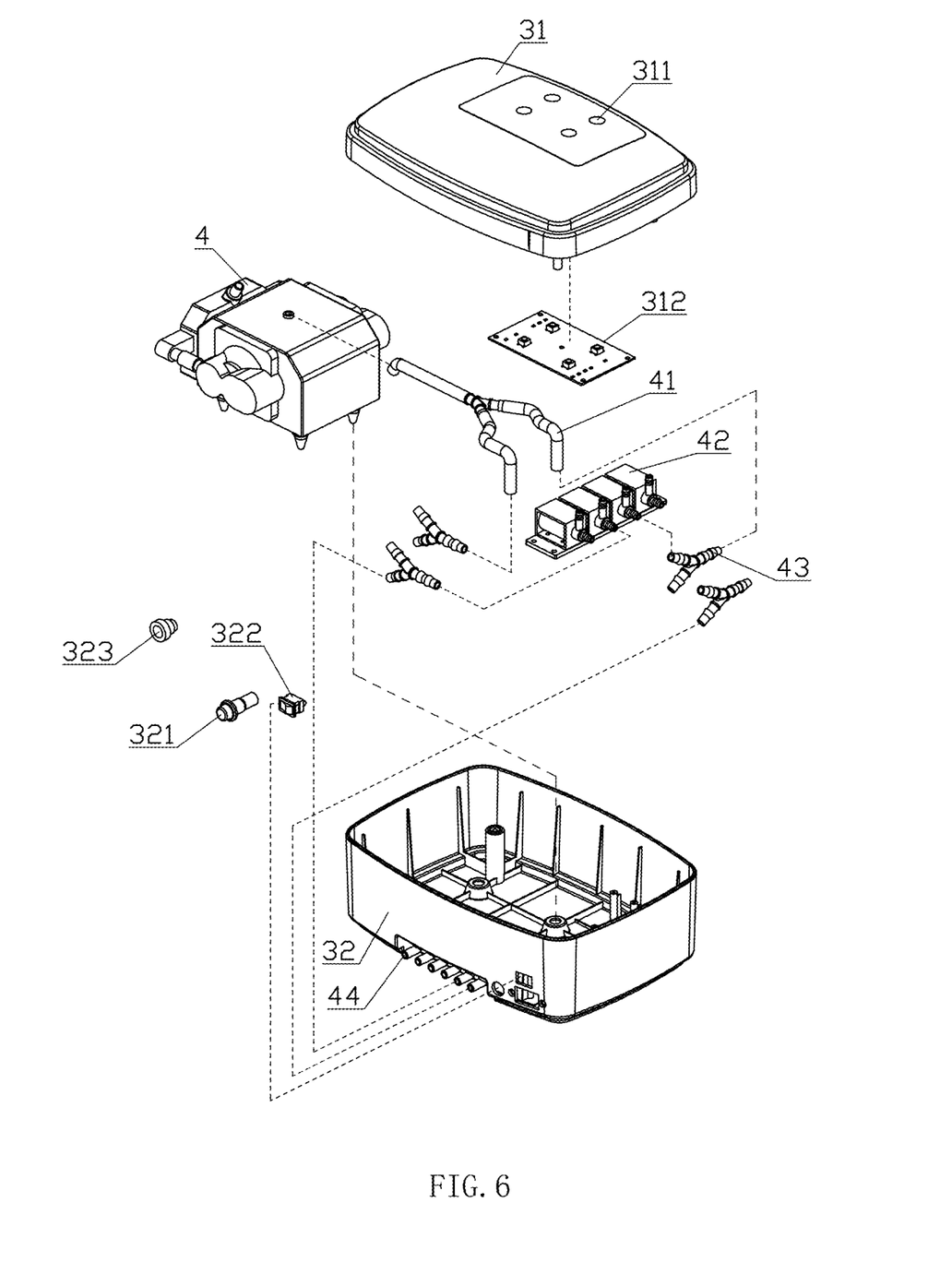
FIG. 6 is a perspective view showing the exploded components of a part of the air inflatable massage cushion according to the first embodiment of the present invention.

Referring to FIGS. 5 and 6, an air pump 4 is received in a control box 3, wherein the control box 3 includes a first cap 31 and a second cap 32 which are both made of plastic, the first cap 31 has a control panel 311 electrically connected with a circuit board 312, and the circuit board 312 is connected with the air pump 4, the air pump 4 is connected with a valve element 42 via multiple connection tubes 41, and the valve element 42 is connected with multiple air outlets via multiple Y-shaped tubes 43, wherein the multiple air outlets 44 are defined on the second cap 32 and communicate with the multiple air tubes 2.

In operation, the airs flow into the air pump 4 from the one air chamber set via the multiple air inlets 122, the multiple air valves 123, and the one air tube 2 so that the air pump 4 drives the airs to flow into another air tube 2 through the multiple connection tubes 41, the valve element 42, the multiple Y-shaped tubes 43, and the multiple air outlets 44, and the airs further flow into another air inflation unit via another air tube 2.

Thereby, the airs are inflated into a half of the multiple air units after the massage cushion is electrically conductive to operate, and the airs are deflated from the other half of the multiple air units, thus projecting and denting the multiple air units alternatively. The valve element 42 supplies or draws the airs to or from the multiple air tubes 2 via the multiple Y-shaped tubes 43.

The second cap 32 includes a fuse 321, a switch 322, a power socket 323, wherein the power socket 323 and the switch 322 are connected with the air pump 4, and the circuit board 312 drives four relays via four drive circuits of the four relays so as to correspond to three air inflation levels and an air deflation level (wherein the three air inflation levels are distinguished by three air inflating times which are 1 minute, 3 minutes, and 5 minutes). In addition, a time key, a start key, a massage level key, and a frequency key of the circuit board are connected with multiple power indicators so that the multiple power indicators display a working time, a working state and a pumping frequency of the air pump 4 and an air flow exchanging volume of the two air inflation units.

The control circuit of the motherboard 312 is connected with an AC 220V power supply via a power supply module so that the AC 220V power supply supplies power to the circuit board, and the multiple power indicators display a working state of the power supply module. The power supply module is connected with a remote control receiver module, the remote control receiver module includes a receive antenna configured to receive a control signal of a remote control and to send the control signal to the control circuit of the circuit board. Then, the circuit board controls the air pump 4 to work based on the control signal.

The remote control has a launch module configured to control the power supply module to supply power, to receive a control instruction input by a control key of the remote control, and to send the control instruction to the receive antenna of the remote control receiver module by a transmission antenna.

The control box 3 is actuated by the power to inflate or deflate the airs to the air inflatable massage cushion. In another embodiment, the control box is replaced by an electric air pump. The power is 200V mains converted into 22V, 24V or 5V, 12V. Alternatively, the power is a charger or a chargeable battery.

Figure 7:
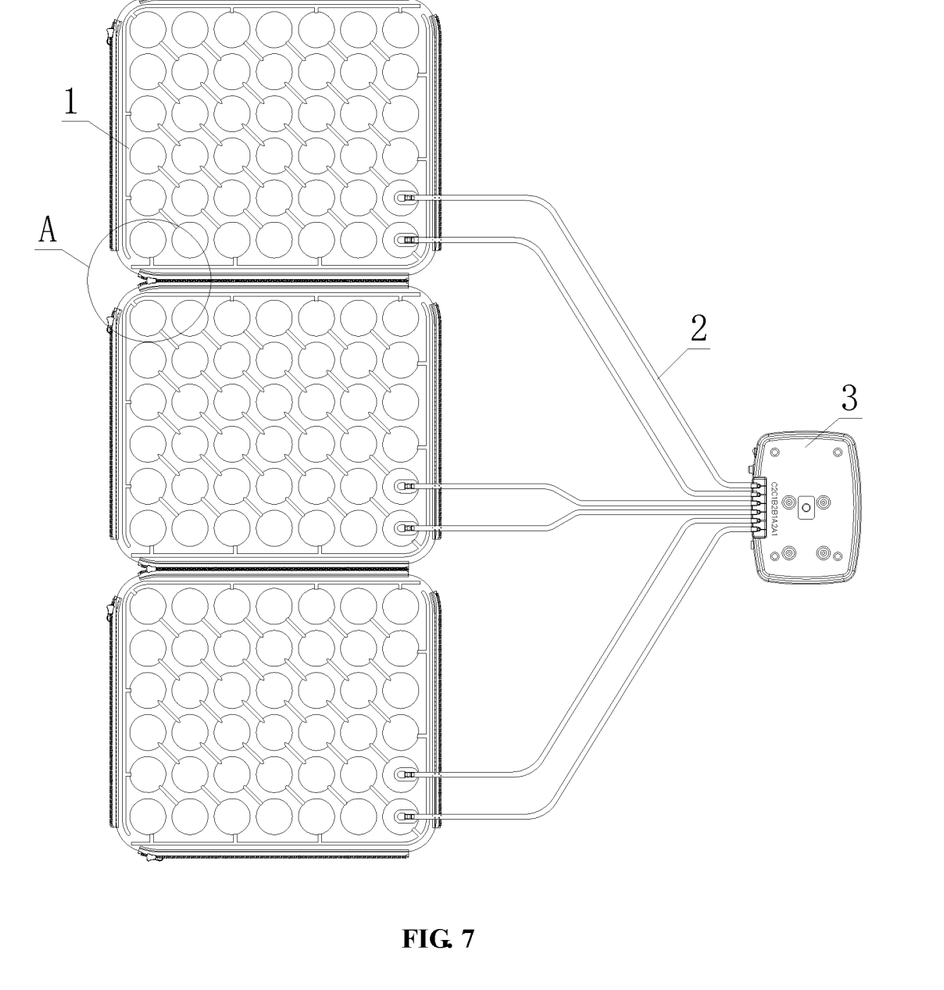
FIG. 7 is a side plane view showing the application of an air inflatable massage cushion according to a second embodiment of the present invention.
Figure 8:
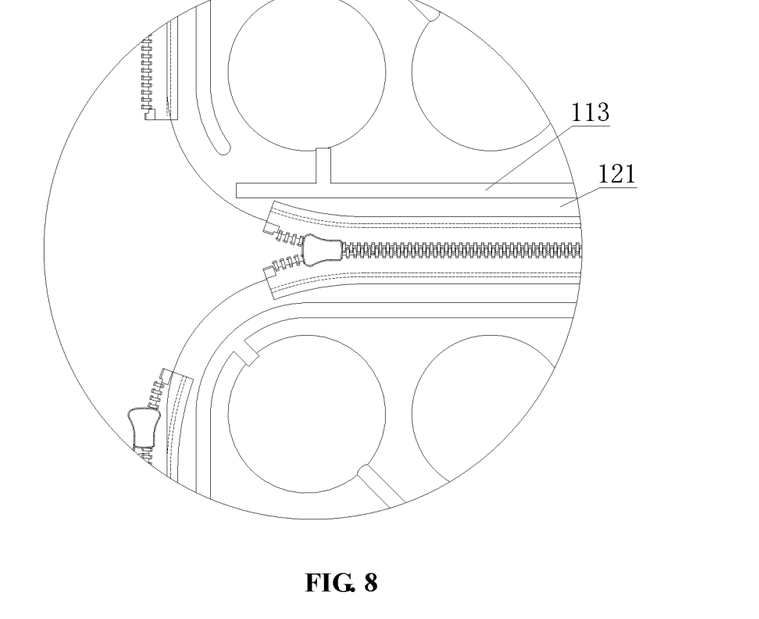
FIG. 8 is an amplified side plane view showing a portion A of FIG. 7.
Figure 9:
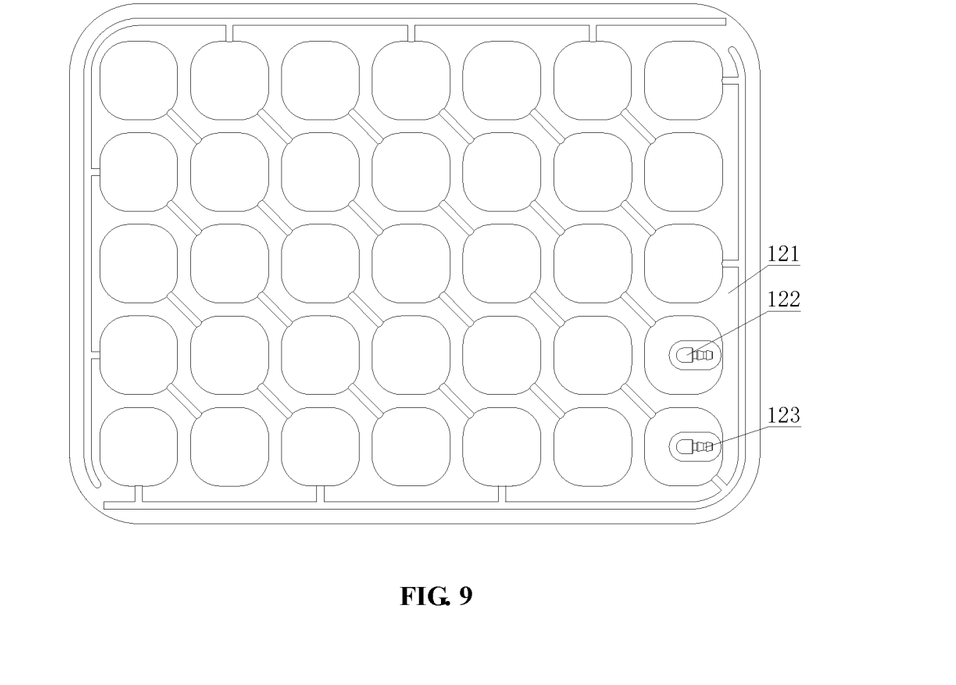
FIG. 9 is a side plan view showing the application of another part of the air inflatable massage cushion according to the second embodiment of the present invention.

With reference to FIGS. 7-9, in a second embodiment, at least two air inflatable massage cushions are connected by using at least one zipper.

For example, three air inflatable massage cushions are connected, wherein the control box 3 is connected with the multiple air tubes 2, and a respective air inflatable massage cushion is connected with the control box 3 via two air tubes 2 so as to be inflated or deflated the airs to or from the two air inflation units of the respective air inflatable massage cushion.

A respective zipper is sewed on the peripheral side of the bottom face 121 (i.e. an outer wall of the respective air conduit 113) so as to connect any two air inflatable massage cushion. In another embodiment, multiple bodies are connected by at least one hook and loop fastener (not shown) or at least one button (not shown).

Figure 1:
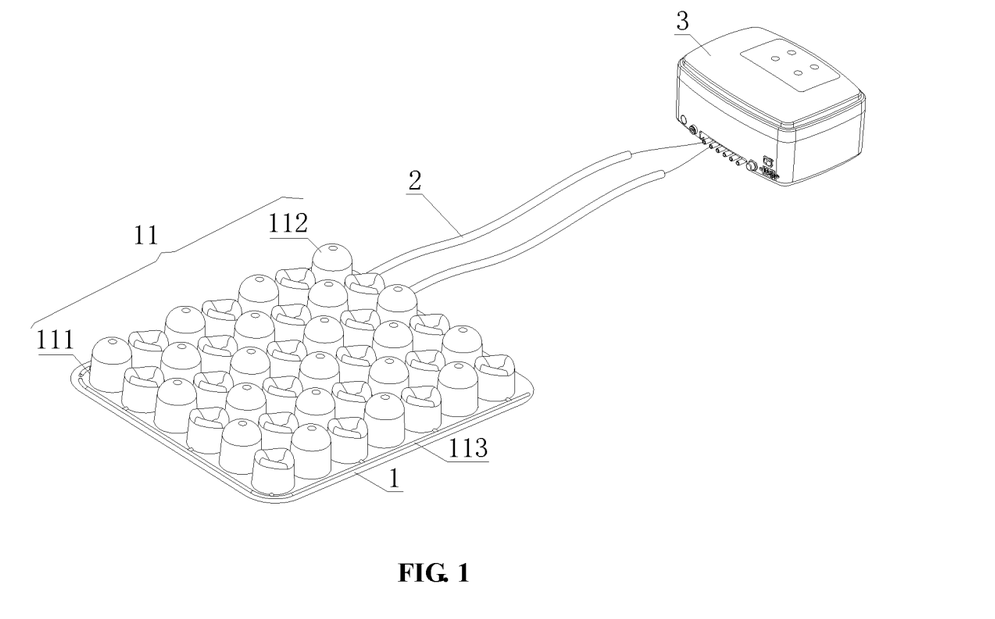
FIG. 1 is a perspective view showing the assembly of an air inflatable massage cushion according to a first embodiment of the present invention.
Figure 2:
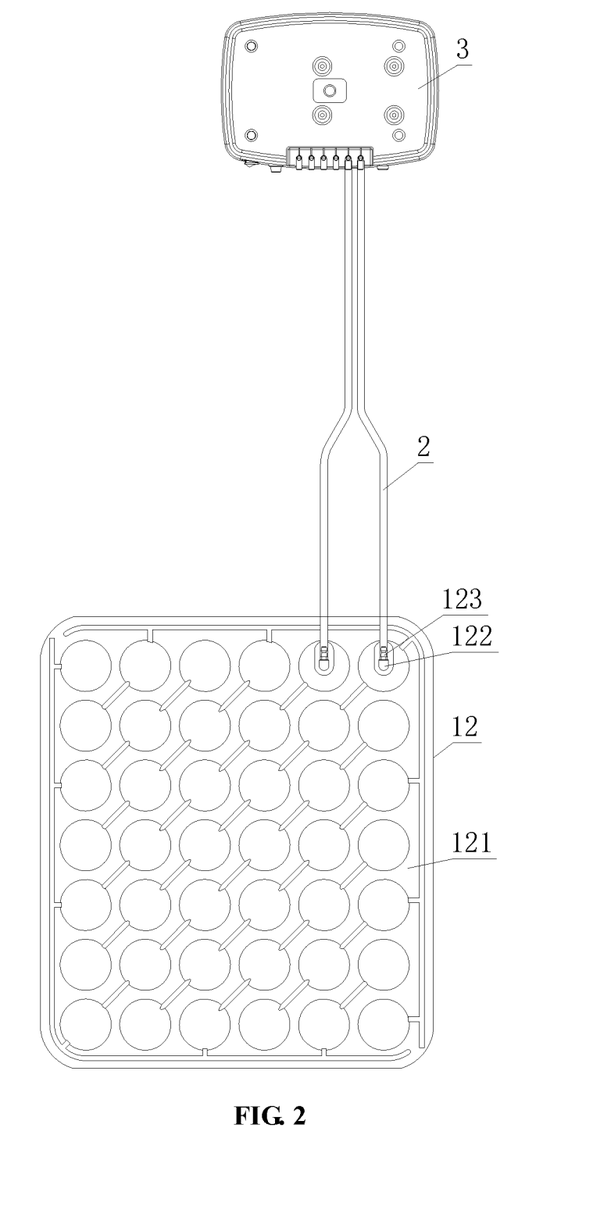
FIG. 2 is a side plane view showing the assembly of the air inflatable massage cushion according to the first embodiment of the present invention.

As illustrated in FIG. 9, the respective air inflatable massage cushion comprises the bottom face 121, the multiple air orifices 122, and multiple air nozzles 123 which are the same as those of FIG. 1.

Figure 10:
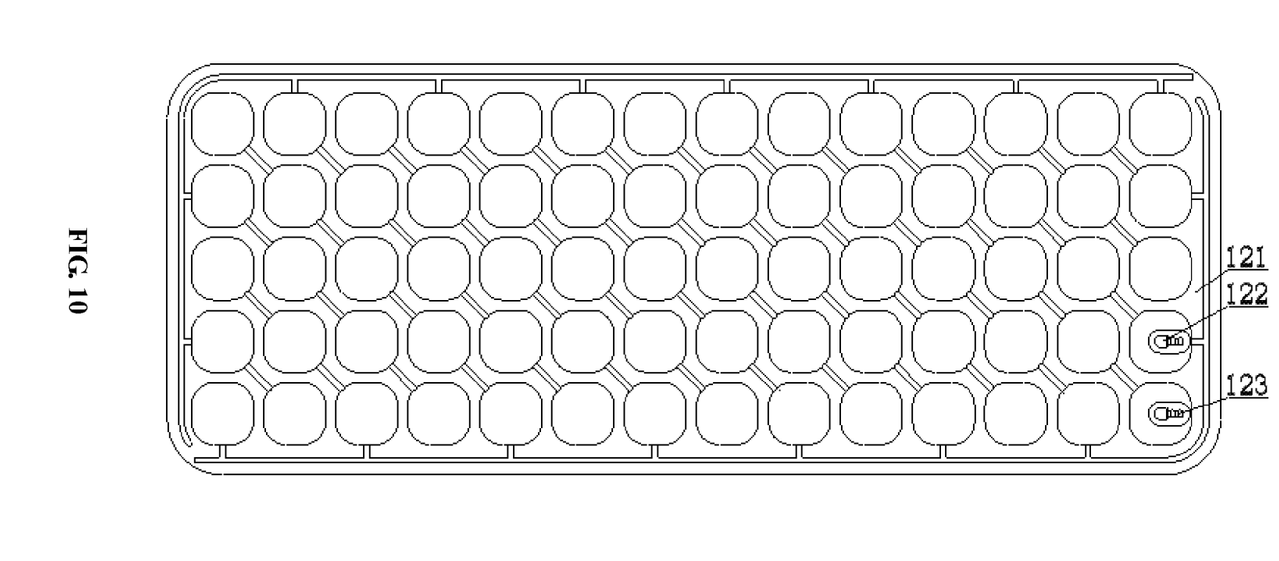
FIG. 10 is a side plan view showing the assembly of an air inflatable massage cushion according to a third embodiment of the present invention.
Figure 11:
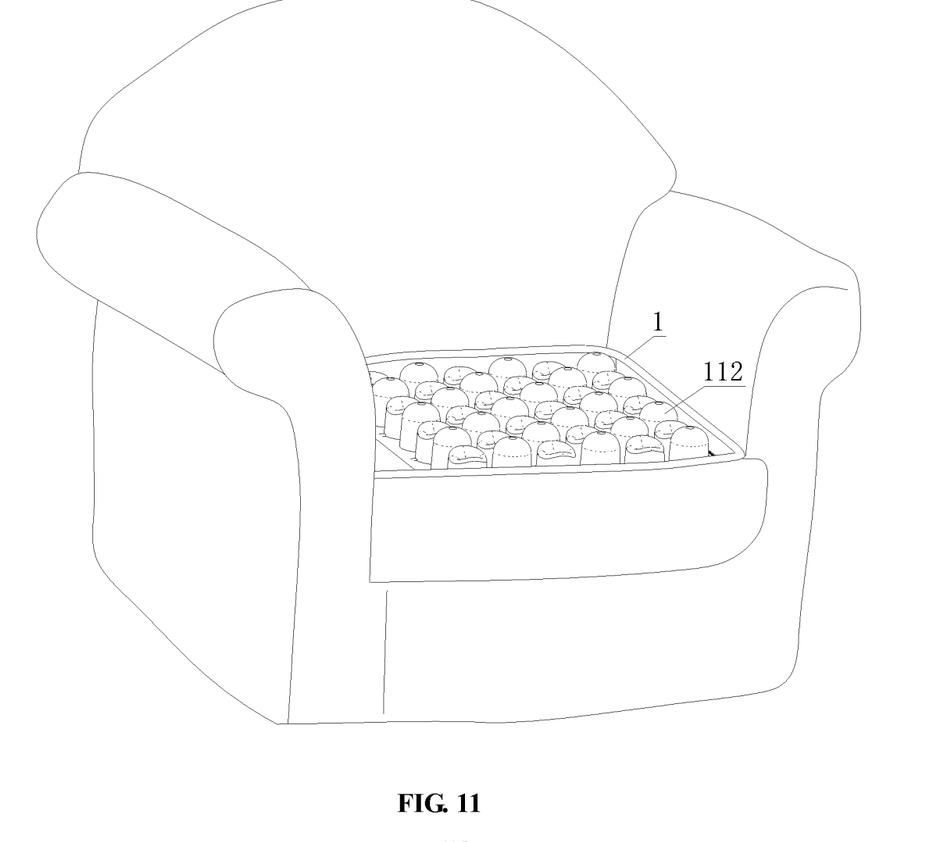
FIG. 11 is a perspective view showing the application of an air inflatable massage cushion according to a fourth embodiment of the present invention.

Referring to FIG. 10, in a third embodiment, the second cushion layer 12 is applicable for a bed mattress. As shown in FIG. 11, in a fourth embodiment, the second cushion layer 12 is applicable for a sofa cushion or is arranged on a wheelchair, wherein only the body 1 is shown in FIG. 11, and the multiple air tubes 2 and the control box 3 are not shown in FIG. 11. With reference to FIG. 10, the body 1 is elongated so as to be applicable for the bed mattress. Alternatively, the body 1 is formed in a square shape so as to be applicable for the sofa cushion or is arranged on the wheelchair.

Figure 12:
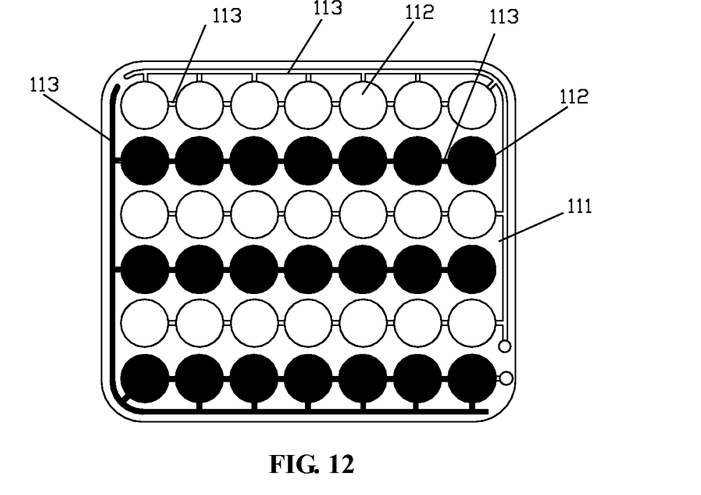
FIG. 12 is a side plan view showing the application of an air inflatable massage cushion according to a fifth embodiment of the present invention.

Referring to FIG. 12, the difference of an air inflatable massage cushion of a fifth embodiment from that of the first embodiment comprises a top face 111 formed on the body 1.

The top face 111 includes two air inflation units, wherein a respective air inflation unit has an air conduit 113 and multiple airbags 112, wherein two air inflation units are arranged on a peripheral side of the top face 111, the air conduit 13 of the respective air inflation unit is formed in an L shape or an inverted L shape, and the air conduit 113 is communicated with the multiple airbags 112 so as to inflate or deflate the airs. It is to be note that one air inflation unit is marked by a white color, and the other air inflation unit is marked by a black color, wherein the multiple airbags 112 of the one air inflation unit marked by the white color are arranged in a row, and the multiple airbags 112 of the other inflation unit marked by the black color are arranged in another row, wherein the multiple airbags 112 of the one air inflation unit marked by the white color are adjacent to the multiple airbags 112 of the other inflation unit marked by the black color, such that when the multiple airbags 112 of the one air inflation unit are inflated, the multiple airbags 112 of the other air inflation unit are deflated, thus massaging a user.

Figure 13:
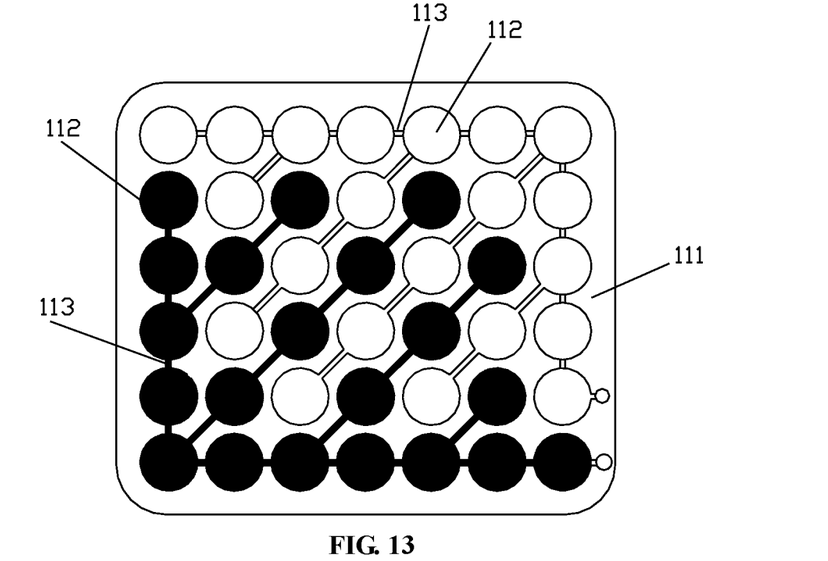
FIG. 13 is a side plan view showing the application of an air inflatable massage cushion according to a sixth embodiment of the present invention.

With reference to FIG. 13, the difference of an air inflatable massage cushion of a sixth embodiment from that of the fifth embodiment comprises multiple airbags 112, two air conduits 113, and two air inflation units of the body 1, wherein the multiple airbags 112 are communicated via a respective air conduit 113 of a respective air inflation unit.

It is to be note that one air inflation unit is marked by a white color, and the other air inflation unit is marked by a black color, wherein the multiple airbags 112 of the one air inflation unit marked by the white color are arranged horizontally, vertically or obliquely, and the multiple airbags 112 of the other inflation unit marked by the black color are arranged vertically, horizontally or obliquely, wherein the multiple airbags 112 of the one air inflation unit marked by the white color and arranged obliquely are adjacent to the multiple airbags 112 of the other inflation unit marked by the black color and arranged obliquely, such that when the multiple airbags 112 of the one air inflation unit are inflated, the multiple airbags 112 of the other air inflation unit are deflated, thus massaging a user.

The multiple airbags 112 of the other inflation unit marked by the white color or the multiple airbags 112 of the other inflation unit marked by the black color are communicated via the respective air conduit 113.

Figure 14:
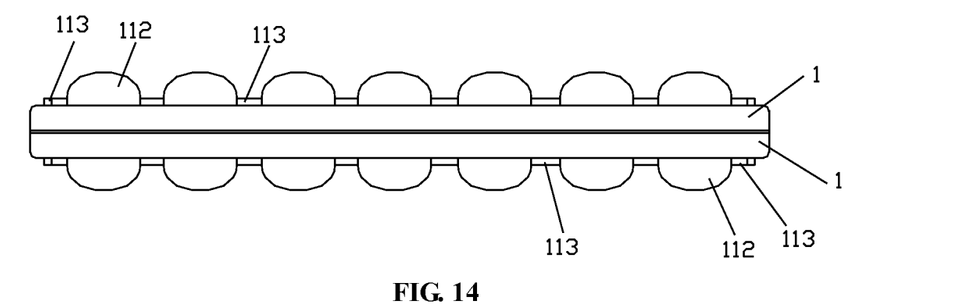
FIG. 14 is a side plan view showing the application of an air inflatable massage cushion according to an seventh embodiment of the present invention.

With reference to FIG. 14, the difference of an air inflatable massage cushion of a seventh embodiment from that of the first embodiment is applicable for a mattress and comprises two bodies 1 connected, wherein multiple airbags 112 of one of the two bodies 1 extrude upward so as to enhance height and support of the mattress.

Furthermore, at least two air inflation units are provided so that when one air inflation unit is inflated, the other air inflation unit is deflated, thus enhancing massage.

Multiple air conduits are arranged in a peripheral side of the air inflatable massage cushion and are communicated with the multiple airbags, thus inflating and deflating the airs into or from the air inflatable massage cushion.

The two bodies 1 of the air inflatable massage cushion are applicable for a sitting cushion, a wheelchair cushion, a sofa cushion, and a pillow cushion.

Figure 15:
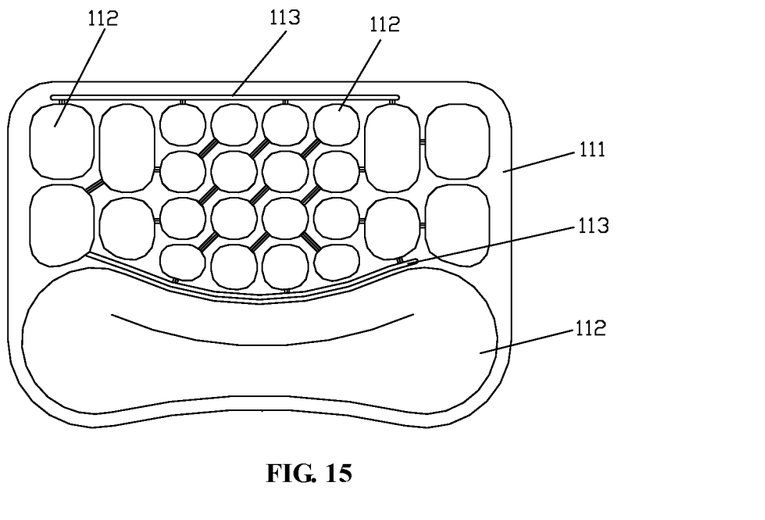
FIG. 15 is a side plan view showing the application of an air inflatable massage cushion according to an eighth embodiment of the present invention.

In an eighth embodiment, multiple air conduits of different sizes are arranged in an air inflatable massage cushion, as shown in FIG. 15, and the inflatable massage cushion is a pillow cushion.

For example, some airbags 112 adjacent to a peripheral side of a respective body 1 have a size more than a size of the other airbags 112 arranged on a middle portion of the respective body 1, wherein one of the multiple airbags 112 is elongated so as to support a user's neck.

Two air conduits 113 are arranged in a top face 111 of one body 1, and multiple air orifices 122 and multiple air nozzles 123 are arranged in a top face 111 of the other body 1.

The air inflatable massage cushion is formed in any one of a square shape, a triangle shape, a regular polygon shape, a heart shape, a star shape, and an animal shape.

The multiple air conduits are configured to inflate the airs into the multiple airbags which are not communicated so that after the air inflatable massage cushion is electrically conductive to work, some airbags are inflated, and the other airbags are deflated, thus protruding and sinking the multiple airbags alternately to massage the user.

Preferably, the multiple airbags have different shapes, sizes, heights, and positions which are adjustable so as to satisfy various using requirements. The air inflatable massage cushion is operated easily in a remote control manner.

The air inflatable massage cushion is applicable for the sitting cushion, the wheelchair cushion, the sofa cushion, and the pillow cushion, and a waist cushion.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. An air inflatable massage cushion, which is connected with a control box, and the air inflatable massage cushion comprising:
    at least one body comprising an inflation area and an edge area arranged surrounding the inflation area,
    wherein the inflation area comprises a first air channel extending along one side of the edge area and a second air channel extending along another side of the edge area, a first air inflation unit in air communication with the first air channel and having at least two interconnected first airbags, and a second air inflation unit in air communication with the second air channel and having at least two interconnected second airbags, the at least two interconnected first airbags connect each other via a first group of air guide channels, the at least two interconnected second airbags connect each other via a second group of the air guide channels, the at least two interconnected first airbag are disconnected with the at least two interconnected second airbags,
    the at least one body comprises a first cushion layer and a second cushion layer stacked with the first cushion layer,
    the first air channel, the second air channel, the at least two interconnected first airbags, and the at least two interconnected second airbags are each a hollow protruding structure formed by the first cushion layer protruding away from the second cushion layer,
    wherein the second cushion layer comprises a bottom face, a first air orifice, a second air orifice, a first air nozzle and a second air nozzle, the first air orifice is defined at a bottom of one first airbag proximate to the edge area, the first air nozzle is arranged at the first air orifice and in air communication with first air channel,
    the second air orifice is defined at a bottom of one second airbag near the first airbag which is proximate to the edge area, the second air nozzle is arranged at the second air orifice and in air communication with the second air channel,
    the first air inflation unit is connected to the control box via the first air channel, and the second air inflation unit in the inflation area is connected to the control box via the second air channel, and when one of the first air inflation unit and the second air inflation unit is inflated, another one of the first air inflation unit and the second air inflation unit is deflated, thereby making the inflation area obtain a dynamic structure with staggered heights.

2. The air inflatable massage cushion as claimed in claim 1, wherein the first air inflation unit comprises a plurality of first airbag groups arranged in parallel, each of the plurality of first airbag groups comprises at least one first airbag connected in series,
    the second airbag unit comprises a plurality of second airbag groups arranged in parallel, each of the plurality of second airbag groups comprises at least one second airbag connected in series,
    the plurality of first airbag groups and the plurality of second airbag groups are alternately arranged, the first airbags of the plurality of first airbag groups are in air communication via the first air channel, and the second airbags of the plurality of second airbag groups are in air communication via the second air channel.

3. The air inflatable massage cushion as claimed in claim 2, wherein an first arrangement direction of the first airbags in each of the first airbag groups is arranged obliquely relative to the first air channel, or arranged perpendicular to the first air channel, and a second arrangement direction of the second airbags in each of the second airbag groups is arranged obliquely relative to the second air channel, or arranged perpendicular to the second air channel.

4. The air inflatable massage cushion as claimed in claim 3, wherein the first arrangement direction forms an included angle of 45 degrees with the first air channel, and the second arrangement direction forms an included angle of 45 degrees with the second air channel.

5. The air inflatable massage cushion as claimed in claim 2, wherein
    the at least one first airbag is arranged adjacent to the second airbag on at least two sides, which are selected from two sides in a first direction and two sides in a second direction perpendicular to the first direction, and the at least one second airbag is arranged adjacent to the first airbag on at least two sides, which are selected from two sides in the first direction and two sides in the second direction, the first direction is arranged parallel to an first arrangement direction of the first airbags in each of the first airbag groups or intersected with the first arrangement direction.

6. The air inflatable massage cushion as claimed in claim 1, wherein the body comprises two first cushion layers arranged at two opposite surfaces of the at least one body, respectively, with the second first cushion disposed between the two first cushion layers, each of the two first cushion layers protrudes away from the second cushion layer to form the corresponding first air channel, the corresponding second air channel the corresponding at least two interconnected first airbags and the corresponding at least two interconnected second airbags.

7. The air inflatable massage cushion as claimed in claim 1, wherein the air inflatable massage cushion is connected with the control box via a plurality of air tubes, an air pump is received in the control box, wherein the control box includes a cap, the cap has a control panel electrically connected with a circuit board, and the circuit board is connected with the air pump, the air pump is connected with a valve element via a plurality of connection tubes, the cap has a plurality of air outlets communicated with the plurality of air tubes, respectively, and connected to the valve element via a plurality of tubes.

8. The air inflatable massage cushion as claimed in claim 1, wherein the inflation area is formed in a square shape, and one of the first air channel and the second air channel is formed in an L shape, and another one of the first air channel and the second air channel is formed in an inverted L shape.

9. The air inflatable massage cushion as claimed in claim 1, wherein the air inflatable massage cushion comprises a plurality of bodies, a plurality of airbags between the plurality of bodies are not in air communication.

10. The air inflatable massage cushion as claimed in claim 1, wherein the inflation area comprises a plurality of first airbag groups in air communication with the first air channel and other airbag groups not in air communication with the plurality of first airbag groups, at least one of the plurality of first airbag groups comprises a primary airbag of the at least two interconnected first airbags connected to the first air channel, and a secondary airbag of the at least two interconnected first airbags connected to the primary airbag.

11. An air inflatable massage cushion, which is connected with a control box via a plurality of air tubes, and the air inflatable massage cushion comprising:
at least one body comprising an inflation area and an edge area arranged surrounding the inflation area,
wherein the inflation area comprises a first air inflation unit having at least two interconnected first airbags, and a second air inflation unit having at least two interconnected second airbags,
the two interconnected first airbags are disconnected with the two interconnected second airbags, and the two interconnected first airbags and the two interconnected second airbags are arranged in a staggered manner,
the first air inflation unit and the second air inflation unit in the inflation area are connected to the control box via the different air tubes, and when one of the first air inflation unit and the second air inflation unit is inflated, another one of the first air inflation unit and the second air inflation unit is deflated, thereby making the inflation area obtain a dynamic structure with staggered heights, each of the at least one body comprises a first cushion layer and a second cushion layer arranged at a bottom of the first cushion layer,
the first cushion layer comprises a top face, and the two interconnected first airbags and the two interconnected second airbags extending from the top face;
the second cushion layer comprises a bottom face, a first air orifice, a second air orifice, a first air nozzle and a second air nozzle, the first air orifice is defined at a bottom of one first airbag proximate to a peripheral side of the inflation area, the first air nozzle is arranged at the first air orifice and in air communication with a corresponding air tube,
the second air orifice is defined at a bottom of one second airbag near the first airbag which is proximate to the peripheral side of the inflation area, the second air nozzle is arranged at the second air orifice and in air communication with a corresponding air tube.

12. The air inflatable massage cushion as claimed in claim 11, wherein each of the at least one body comprises two first cushion layers arranged at two opposite surfaces of the at least one body, respectively, each of the first cushion layer comprises a top face, and the two interconnected first airbags and the two interconnected second airbags extending from the top face.

13. The air inflatable massage cushion as claimed in claim 12, wherein an air pump is received in the control box, wherein the control box includes a cap, the cap has a control panel electrically connected with a circuit board, and the circuit board is connected with the air pump, the air pump is connected with a valve element via a plurality of connection tubes, the cap has a plurality of air outlets communicated with the plurality of air tubes, respectively, and connected to the valve element via a plurality of tubes.

14. The air inflatable massage cushion as claimed in claim 11, wherein the inflation area comprises a first air channel extending along one side of the edge area and a second air channel extending along another side of the edge area, the first air inflation unit is connected to a corresponding air tube via the first air channel, and the second inflation unit is connected to a corresponding air tube via the second air channel.

15. An air inflatable massage cushion, which is connected with a control box, and the air inflatable massage cushion comprising:
at least one body comprising an inflation area and an edge area arranged surrounding the inflation area,
wherein the inflation area comprises a first air flow path extending along one side of the edge area, a second air flow path extending along the other side of the edge area, a first air inflation unit in air communication with the first air flow path and comprising a plurality of first airbag groups arranged in parallel, a second air inflation unit in air communication with the second air flow path and comprising a plurality of second airbag groups arranged in parallel,
each of the plurality of first airbag groups comprises at least one first airbag connected in series,
each of the plurality of second airbag groups comprises at least one second airbag connected in series,
the first air flow path comprises a plurality of interconnected first sub-airbags and a plurality of first sub-air channels connected two adjacent first sub-airbags, and the second air flow path comprises a plurality of interconnected second sub-airbags and a plurality of second sub-air channels connected two adjacent second sub-airbags, when one of the first air inflation unit and the second air inflation unit is inflated, another one of the first air inflation unit and the second air inflation unit is deflated, thereby making the inflation area obtain a dynamic structure with staggered heights,
wherein the at least one body comprises a first cushion layer and a second cushion layer stacked with the first cushion layer, the first air flow path, the second air flow path, the at least two interconnected first airbags, and the at least two interconnected second airbags are each a hollow protruding structure formed by the first cushion layer protruding away from the second cushion layer;
wherein the second cushion layer comprises a bottom face, a first air orifice, a second air orifice, a first air nozzle and a second air nozzle, the first air orifice is defined at a bottom of one first airbag proximate to the edge area, the first air nozzle is arranged at the first air orifice and in air communication with first air flow path,
the second air orifice is defined at a bottom of one second airbag near the first airbag which is proximate to the edge area, the second air nozzle is arranged at the second air orifice and in air communication with the second air flow path.

* * * * *